United States Patent
Idota et al.

(10) Patent No.: US 11,005,143 B2
(45) Date of Patent: May 11, 2021

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tomoki Idota, Mie (JP); Ryouya Okamoto, Mie (JP); Hiroshi Shimizu, Mie (JP); Hitoshi Takeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 197 days.

(21) Appl. No.: 16/318,975

(22) PCT Filed: Jul. 6, 2017

(86) PCT No.: PCT/JP2017/024777
§ 371 (c)(1),
(2) Date: Jan. 18, 2019

(87) PCT Pub. No.: WO2018/016333
PCT Pub. Date: Jan. 25, 2018

(65) Prior Publication Data
US 2019/0312250 A1    Oct. 10, 2019

(30) Foreign Application Priority Data
Jul. 22, 2016    (JP) .............................. JP2016-144617

(51) Int. Cl.
*H01M 2/20*    (2006.01)
*H01M 10/48*    (2006.01)
(Continued)

(52) U.S. Cl.
CPC ....... *H01M 50/502* (2021.01); *H01M 10/482* (2013.01); *H01M 50/20* (2021.01);
(Continued)

(58) Field of Classification Search
CPC ..................... H01M 2/1077; H01M 2/20–208
See application file for complete search history.

(56) References Cited

U.S. PATENT DOCUMENTS

2014/0315441 A1* 10/2014 Kinoshita ............. H01M 2/206
439/627
2015/0125727 A1    5/2015 Lui et al.

FOREIGN PATENT DOCUMENTS

| JP | 2014-107161 | 6/2014 |
| JP | 2015-153554 | 8/2015 |
| WO | 2014/014000 | 1/2014 |

OTHER PUBLICATIONS

Official Communication issued in International Bureau of WIPO Patent Application No. PCT/JP2017/024777, dated Aug. 8, 2017.

* cited by examiner

*Primary Examiner* — Stephan J Essex
(74) *Attorney, Agent, or Firm* — Greenblum & Bernstein, P.L.C.

(57) ABSTRACT

Provided is a wiring module to be attached to a power storage element group having a plurality of power storage elements, the wiring module including: bus bars; a plurality of coupling units for holding the bus bars; and a coupling portion for coupling the plurality of coupling units. The coupling portion includes: a locking portion arranged on an end portion of one coupling unit of the plurality of coupling
(Continued)

units; and a locked portion that is arranged on another coupling unit adjacent to the one coupling unit and onto which the locking portion of the one coupling unit is to be locked. The locking portion extends in a direction intersecting a coupling direction in which the plurality of coupling units are coupled.

2 Claims, 10 Drawing Sheets

(51) Int. Cl.
*H01M 2/10* (2006.01)
*H01M 2/34* (2006.01)
*H01M 50/502* (2021.01)
*H02B 1/21* (2006.01)
*H01M 50/20* (2021.01)
*H01M 50/50* (2021.01)
*H01M 50/572* (2021.01)

(52) U.S. Cl.
CPC ......... *H01M 50/50* (2021.01); *H01M 50/572* (2021.01); *H02B 1/21* (2013.01); *H01M 2220/20* (2013.01)

WIRING MODULE

TECHNICAL FIELD

The technique disclosed in the present specification relates to a wiring module.

BACKGROUND ART

Conventionally, the technique disclosed in JP 2014-97962A has been known as a wiring module to be attached to a battery group including multiple batteries. This wiring module includes bus bars for connecting terminals of adjacent batteries, and an insulating protector for containing the bus bars. Multiple coupling units are coupled to form the insulating protector.

Each coupling unit includes an engaging portion and an engaged portion. The multiple coupling units are coupled by fitting together a fitting piece of one coupling unit and a fitting recess of another coupling unit arranged adjacent thereto. The fitting piece is configured to extend along a coupling direction in which the multiple coupling units are coupled. Also, the fitting recess is provided at a position opposing the fitting piece of the one coupling unit arranged adjacent thereto and the fitting piece is fit therein.

CITATION LIST

Patent Document

Patent Document 1: JP 2013-97962A

SUMMARY OF INVENTION

Technical Problem

However, according to the above-described configuration, a space for providing a fitting piece extending from the one coupling unit to the other coupling unit and a fitting recess into which the fitting piece is to be fit need to be provided in each coupling unit. For this reason, there is a problem in that it is difficult to reduce the size of the coupling units, and furthermore in that it is difficult to reduce the size of the wiring module in which the multiple coupling units are coupled.

The technique disclosed in the present specification has been made based on the foregoing circumstance and aims to reduce the size of a wiring module.

Solution to Problem

The technique disclosed in the present specification is a wiring module to be attached to a battery group having a plurality of batteries, the wiring module including: conductive members; a plurality of coupling units for holding the conductive members; and a coupling portion for coupling the plurality of coupling units. The coupling portion includes: a locking portion arranged on an end portion of one coupling unit of the plurality of coupling units; and a locked portion that is arranged on another coupling unit adjacent to the one coupling unit and onto which the locking portion of the one coupling unit is to be locked, and the locking portion extends in a direction intersecting a coupling direction in which the plurality of coupling units are coupled.

According to the above-described configuration, the multiple coupling units are coupled due to the locking portion and the locked portion, which extend in the direction of intersecting the coupling direction, engaging. As a result, a fitting portion that extends in the coupling direction is not needed, and therefore space for forming the fitting portion and the fitting recess is not needed. Accordingly, each coupling unit can be made smaller, and as a result, the wiring module can be made smaller.

The following aspect is preferable as an embodiment of the technique disclosed in the present specification.

It is preferable that each of the plurality of coupling units includes a unit groove in which a wire is to be arranged, and in a state in which the plurality of coupling units are coupled, the unit grooves are coupled to form a routing groove in which the wire is to be routed, and the locking portion locks onto the locked portion in a state of spanning over the routing groove.

According to the above-described configuration, the wires arranged in the routing groove are prevented from protruding from the routing groove by the locking portion that locks onto the locked portion in a state of spanning over the routing groove.

It is preferable that a cover for covering the routing groove is included, and in a state of covering the routing groove, the cover overlaps with the locking portion from a side opposite to the routing groove.

According to the above-described configuration, the locking portion can be suppressed from coming off of the locked portion by covering the routing groove with the cover. Accordingly, it is possible to suppress the coupling of the coupling unit from coming undone.

Advantageous Effects of Invention

According to the technique disclosed in the present specification, it is possible to reduce the size of a wiring module.

DESCRIPTION OF EMBODIMENTS

Embodiment 1

Embodiment 1 of the technique disclosed in the present specification will be described with reference to FIGS. 1 to 10.

A power storage module 10 according to the present embodiment is mounted in a vehicle such as an electric automobile or a hybrid automobile (not shown) and is used as a power source for driving the vehicle. The power storage module 10 includes a power storage element group 13 in which multiple power storage elements 12 including positive and negative electrode terminals (not shown) are arranged side by side. The multiple electrode terminals are electrically connected by a wiring module 20 (see FIG. 1).

Note that in the following description, description will be given with a Z direction as upward, a Y direction as forward, and an X direction as rightward. Also, regarding multiple identical members, one member is denoted by a reference numeral and the other members are not denoted by reference numerals in some cases.

Power Storage Element 12

Figure 1:
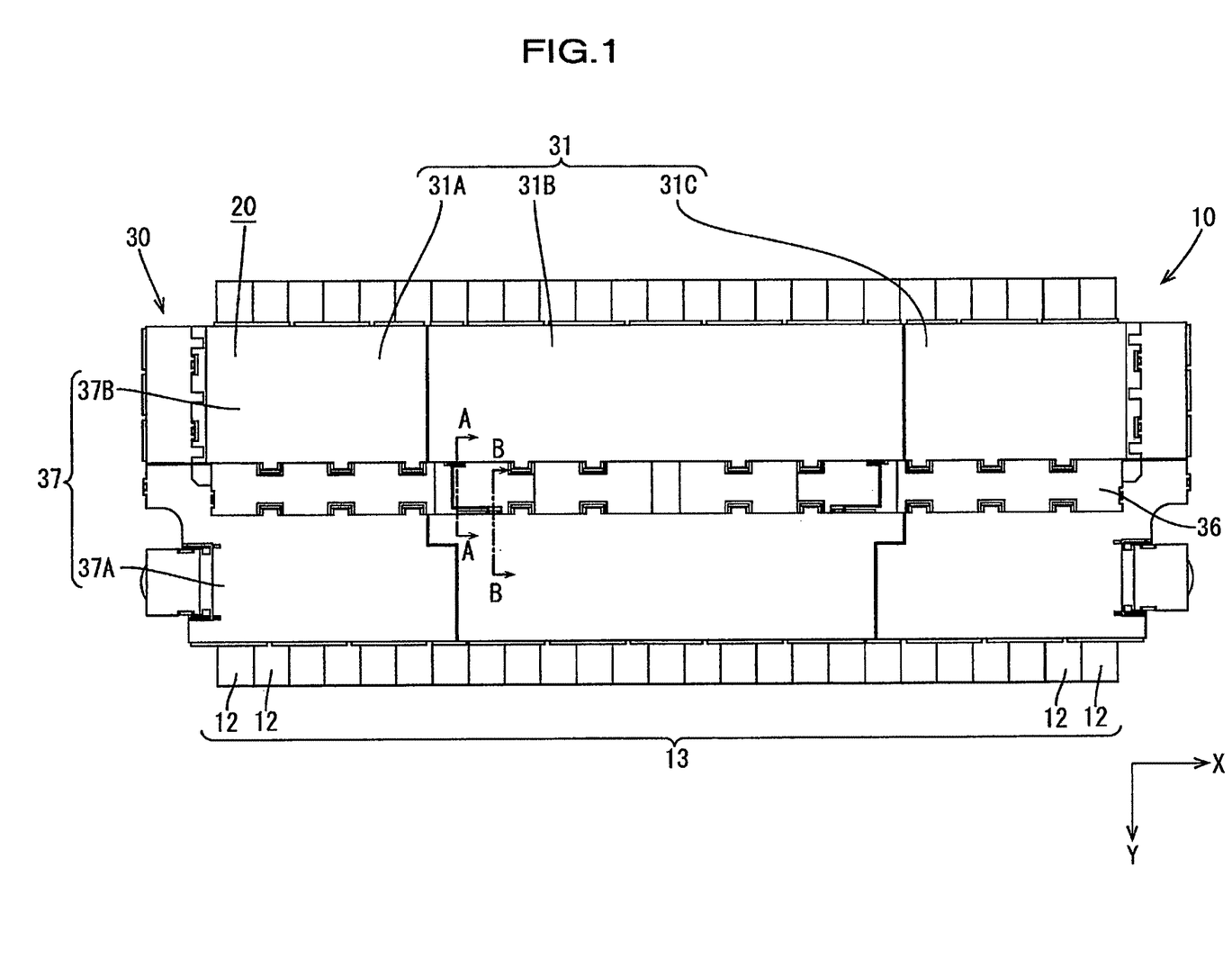
FIG. 1 is a plan view showing a power storage module according to Embodiment 1.

As shown in FIG. 1, the power storage element 12 has a flat, approximately cuboid shape. A power generating element (not shown) is contained inside of the power storage element 12. A pair of electrode terminals (not shown) are formed protruding upward at positions near both end portions in the lengthwise direction on the upper surface of the power storage element 12. The upper surface of the power storage element 12 is an electrode surface. One of the electrode terminals is a positive electrode terminal and the other is a negative electrode terminal. The electrode terminal constituting the positive electrode terminal and the electrode terminal constituting the negative electrode terminal have the same shape and size. The electrode terminals include electrode posts (not shown) that protrude in the form of round columns upward from terminal platforms (not shown) made of metal, and screw ridges are formed on the outer surfaces of the electrode posts. The power storage elements 12 are arranged such that adjacent electrode terminals have different polarities. The multiple power storage elements 12 are arranged side by side in the left-right direction in the drawing to form the power storage element group 13.

Wiring Module 20

The wiring module 20 includes: multiple bus bars 21 (examples of conductive members) made of metal that each include a pair of terminal through holes 22 that are inserted into the electrode posts of the positive and negative electrode terminals of the power storage element 12 and are connected; and multiple coupling units 31 that hold the bus bars 21. The multiple coupling units 31 are coupled by coupling portions 49 provided on the coupling units 31.

Bus Bar 21

Figure 2:
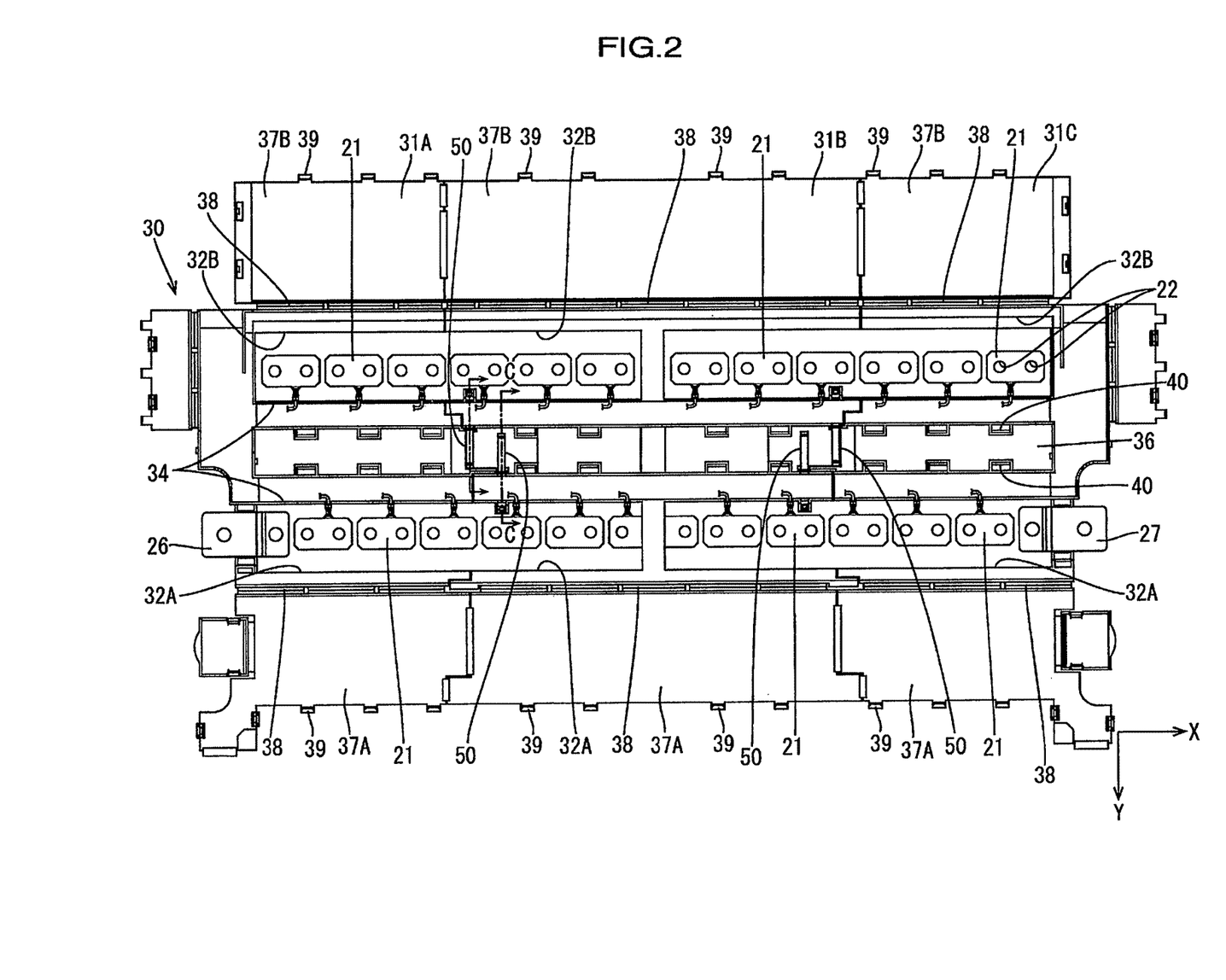
FIG. 2 is a plan view showing a wiring module in a state before a locking portion and a locked portion are engaged, and in which a front-side cover and a left-side cover are open.

The bus bar 21 is formed by pressing a plate material made of metal composed of copper, a copper alloy, stainless steel (SUS), aluminum, or the like into a predetermined shape, and as shown in FIG. 2, the bus bar 21 has an approximately rectangular shape overall. The surface of the bus bar 21 may be plated with a metal such as tin or nickel. In the bus bar 21, a pair of terminal through holes 22 and 22 that have circular shapes and into which the electrode posts of the electrode terminals are to be inserted are formed penetrating through the bus bar 21. The terminal through holes 22 are formed slightly larger than the diameter of the electrode posts. Nuts (not shown) are screwed on in a state in which the electrode posts penetrate through the terminal through holes 22, and the electrode terminals and the bus bar 21 are electrically connected due to the bus bar 21 being sandwiched between the nuts and the terminal platforms.

The wiring module 20 is attached to the upper surface (electrode surface) of the power storage element 12. As shown in FIG. 2, the wiring module 20 is constituted by including: the multiple bus bars 21 connecting the electrode terminals of the adjacent power storage elements; wires 60 that are electrically connected to the bus bars 21 and detect the voltages of the power storage elements 12; and a resin protector 30 that has holding portions 32 for containing and holding the bus bars 21 and has routing grooves 34 for containing and routing the wires 60.

The bus bars 21 according to the present embodiment are provided with wire connection portions 23, and the end portions of the wires 60 are connected to the wire connection portions 23. The wires 60 are formed by covering the peripheries of core wires 61 made of metal with insulating coverings 62. The wire connection portion 23 includes: a wire barrel 24 crimped to the core wire 61; and an insulation barrel 25 crimped to the outer periphery of the insulating covering 62. Note that the connection of the bus bar 21 and the wire 60 is not limited to crimping, which is illustrated as an example in the present embodiment, and connection by any method, such as laser welding, ultrasonic welding, resistance welding, soldering, brazing, and pressure welding can be performed according to need.

Coupling Unit 31

Multiple coupling units 31 are coupled in the coupling direction (in the present embodiment, the X axis direction) to form the resin protector 30. The resin protector has an elongated shape in the left-right direction. As shown in the plan view in FIG. 2, in the coupling units 31, the holding portions 32 that are open upward and contain and hold the bus bars 21 and unit grooves 35 for containing the wires 60 connected to the bus bars 21 are provided in the lengthwise direction of the resin protector 30.

The coupling units 31 include: a left coupling unit 31A arranged on the left end portion of FIG. 2, a right coupling unit 31C arranged on the right end portion, and a center coupling unit 31B arranged between the left coupling unit 31A and the right coupling unit 31C.

Although not shown in detail, multiple bus bars 21 are held side by side in the left-right direction in a state of being insulated from each other in the holding portion 32.

The unit grooves 35 each have a pair of groove wall portions 33A and 33B and a bottom portion 33C and are provided along the alignment direction of the holding portions 32. The groove wall portion 33A on the holding portion 32 side of the pair of groove wall portions 33A and 33B has a portion cut out and thus the wires 60 can be introduced into the unit groove 35 from the holding portion 32 side.

Due to the multiple coupling units 31 being coupled, the unit grooves 35 formed in the coupling units 31 are coupled, whereby the routing grooves 34 in which the wires 60 are routed are formed.

Each coupling unit 31 has a front-side holding portion 32A located on the front portion of the coupling unit 31 and a rear-side holding portion 32B located on the rear portion. A front-side unit groove 35A in which the wire 60 that extends from the bus bar 21 held in the front-side holding portion 32A is provided rearward of the front-side holding portion 32A. Also, a rear-side unit groove 35B in which a wire 60 that extends from the bus bar 21 held in the rear-side holding portion 32B is provided frontward of the rear-side holding portion 32B.

A connecting portion 36 that connects the front-side unit groove 35A and the rear-side unit groove 35B is provided between the front-side unit groove 35A and the rear-side unit groove 35B. The connecting portion 36 has a plate shape that extends in the left-right direction.

Cover 37

A front-side cover 37A (an example of a cover 37) is provided integrally with the coupling unit 31 via a hinge 38 on the front edge of the front-side holding portion 32A. Also, a rear-side cover 37B (an example of a cover 37) is provided integrally with the coupling unit 31 via a hinge 38 on the rear edge of the rear-side holding portion 32B. In the present specification, if description is to be given without making a distinction between the front-side cover 37A and the rear-side cover 37B, "cover 37" will be used in the description.

The front-side cover 37A covers the front-side holding portion 32A and the front-side unit groove 35A from above by rotating using the hinge 38 as a rotation axis. Multiple lock portions 39 are provided on the front edge of the front-side cover 37A, and lock receiving portions 40 that elastically engage with the lock portions 39 are provided at positions corresponding to the lock portions 39 on the front portion of the connecting portion 36.

The rear-side cover 37B covers the rear-side holding portion 32B and the rear-side unit groove 35B from above by rotating using the hinge 38 as a rotation axis. Multiple lock portions 39 are provided on the rear edge of the rear-side cover 37B, and lock receiving portions 40 that elastically engage with the lock portions 39 are provided at positions corresponding to the lock portions 39 on the rear portion of the connecting portion 36.

A left-side external terminal 26 that is to be connected to an external circuit (not shown) is held on the left end portion of the front-side holding portion 32A of the left coupling unit 31A. On the other hand, a right-side external terminal 27 that is to be connected to an external circuit is connected to the right end portion of the front-side holding portion 32A of the right coupling unit 31C.

Locking Structure

Figure 3:
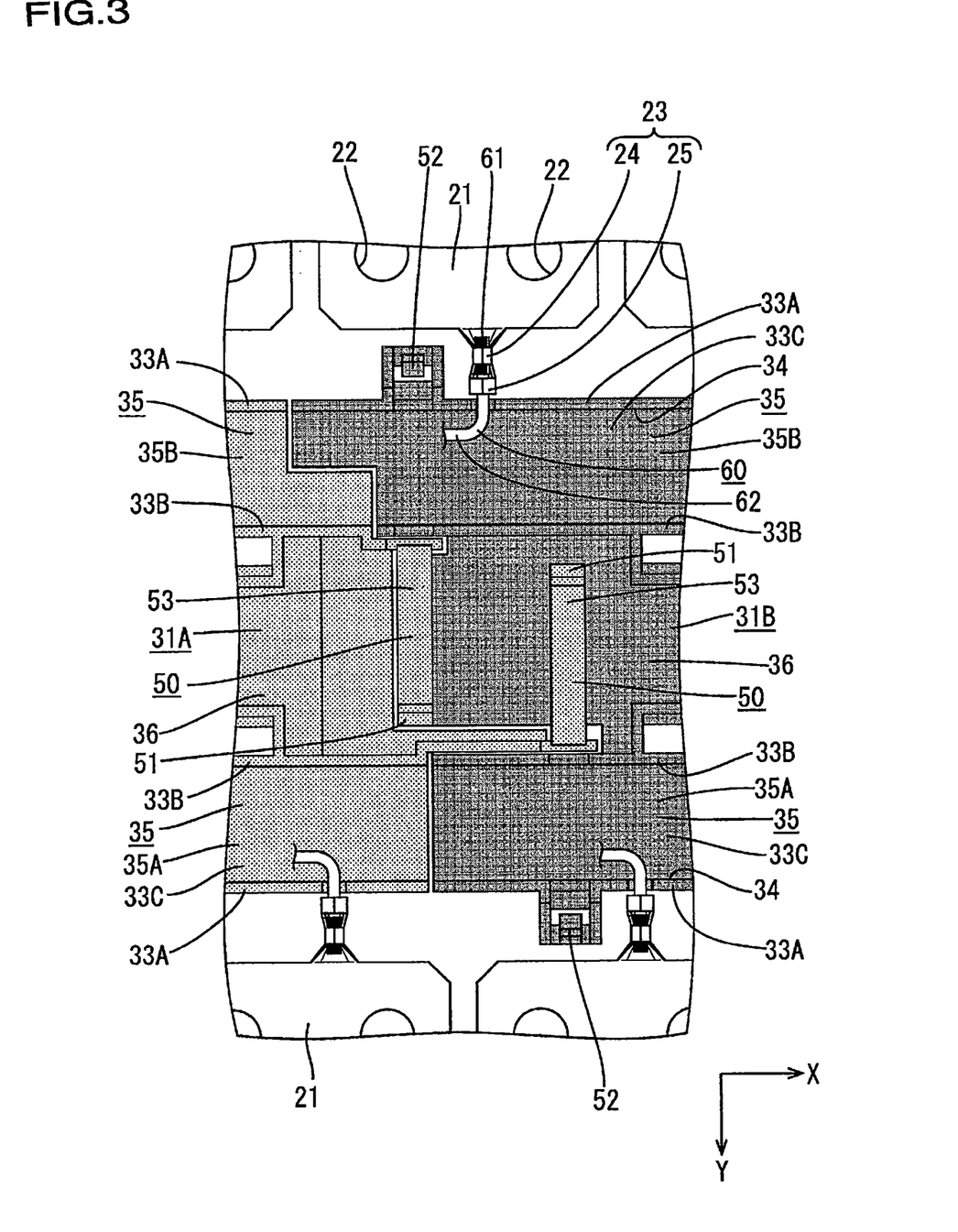
FIG. 3 is a partially enlarged plan view showing the locking portion and the locked portion.

As shown in FIG. 3, on the right end portion of the connecting portion 36 of the left coupling unit 31A, a locking portion 50 formed integrally on the connecting portion 36 via a hinge 41 extends in a direction intersecting the coupling direction (in the present embodiment, the Y axis direction). In the present embodiment, the locking portion 50 includes: a main body portion 53 that has a thin plate shape that extends in a direction orthogonal to the coupling direction; and a bent portion 54 that is bent in a direction orthogonal to the direction in which the main body portion 53 extends, from the leading end of the main body portion 53. The locking portions 50 are provided on the front portion and rear portion of the connecting portion 36. A locking hook 51 is provided protruding outward on the leading end of the bent portion 54.

A locked portion 52 that engages with the locking hook 51 of the locking portion 50 provided on the left coupling unit 31A is provided at a position corresponding to the locking portion 50 on the left end portion of the connecting portion 36 of the center coupling unit 31B.

Also, on the left end portion of the connecting portion 36, the locking portion 50 formed integrally on the connecting portion 36 via the hinge 41 extends in the direction intersecting the coupling direction (in the present embodiment, the Y axis direction). In the present embodiment, the locking portion 50 includes: a main body portion 53 that has a thin plate shape that extends in a direction orthogonal to the coupling direction; and a bent portion 54 that is bent in a direction orthogonal to the direction in which the main body portion 53 extends, from the leading end of the main body portion 53. The locking portions 50 are provided on the front portion and rear portion of the connecting portion 36. The locking portions 50 have an elongated plate shape. The locking hooks 51 are provided protruding on the leading ends of the bent portions 54.

The locked portion 52 that engages with the locking hook 51 of the locking portion 50 provided on the right coupling unit 31C is provided at a position corresponding to the locking portion 50 on the right end portion of the connecting portion 36 of the center coupling unit 31B.

Figure 4:
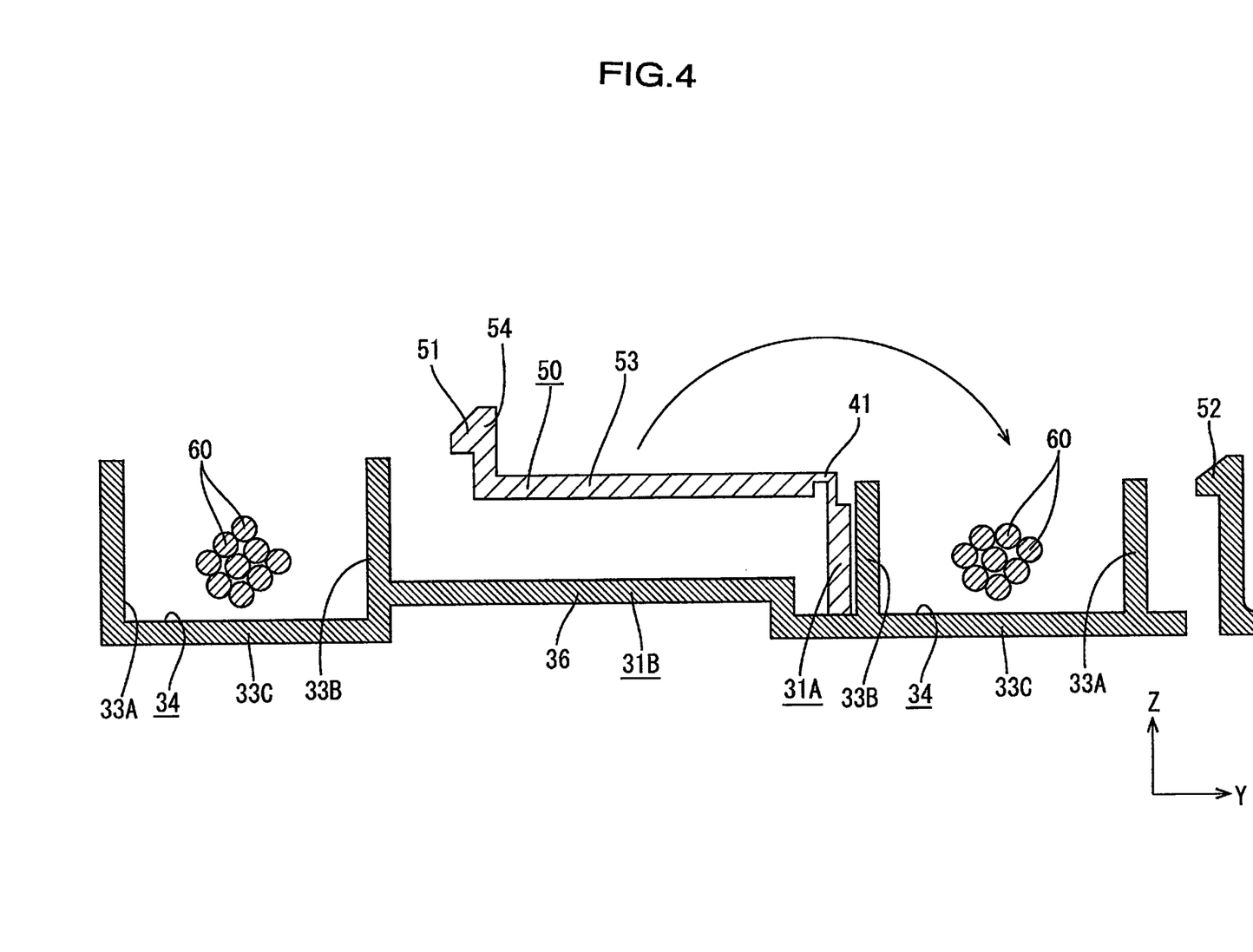
FIG. 4 is a cross-sectional view taken along line C-C in FIG. 2.
Figure 5:
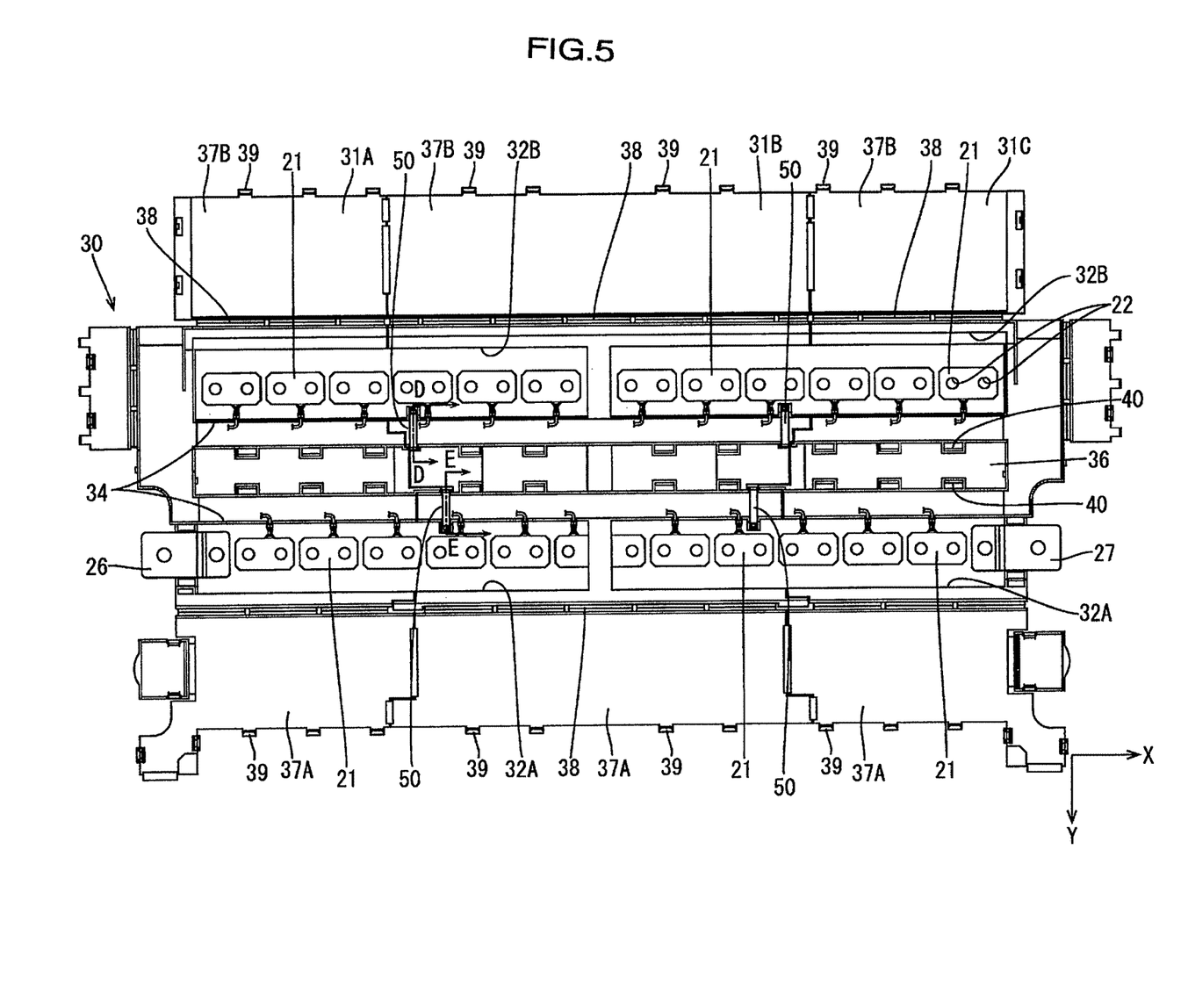
FIG. 5 is a plan view showing a wiring module in a state in which a locking portion and a locked portion are engaged, and in which a front-side cover and a left-side cover are open.
Figure 6:
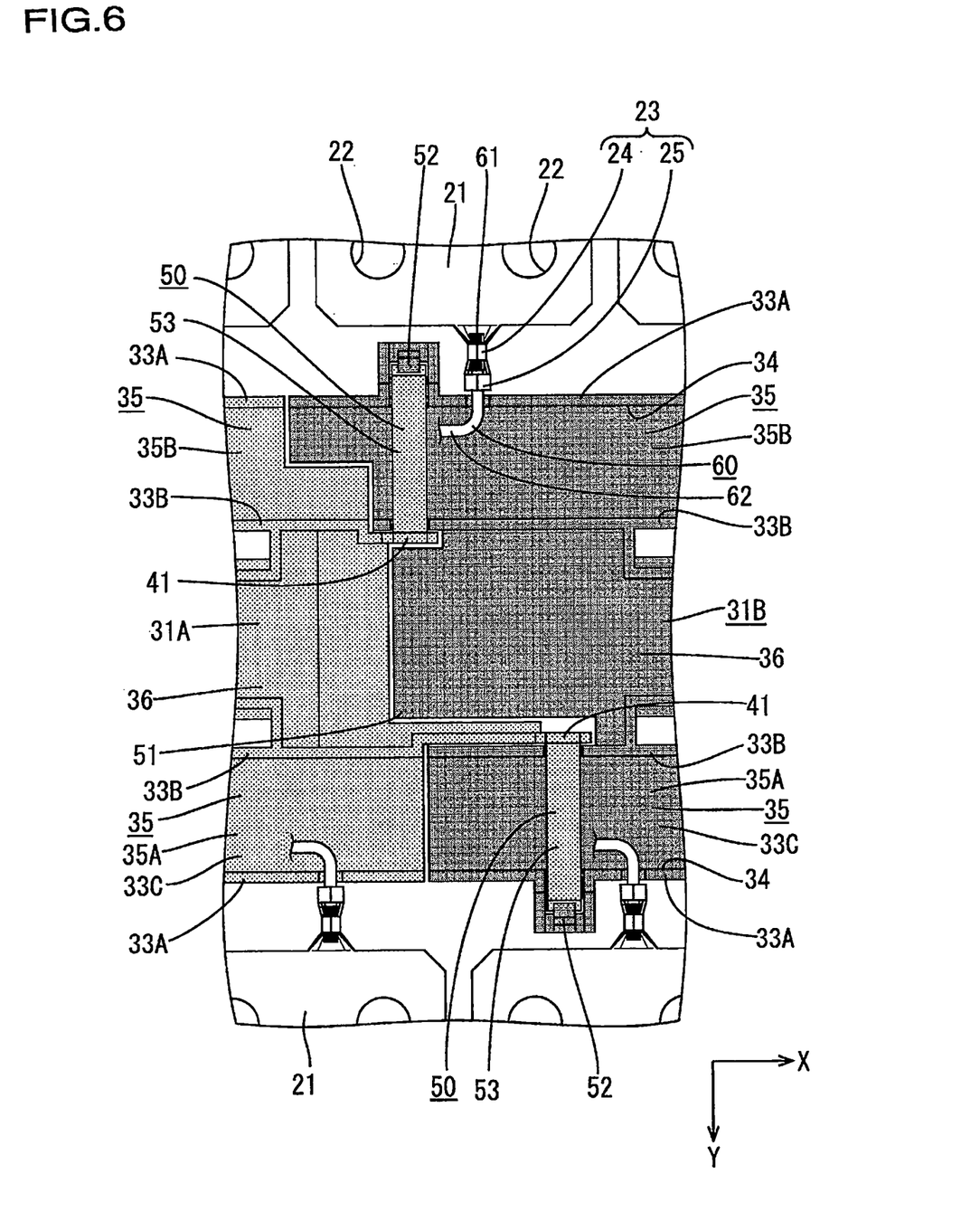
FIG. 6 is a partially enlarged plan view showing a state in which the locking portion and the locked portion are engaged.
Figure 7:
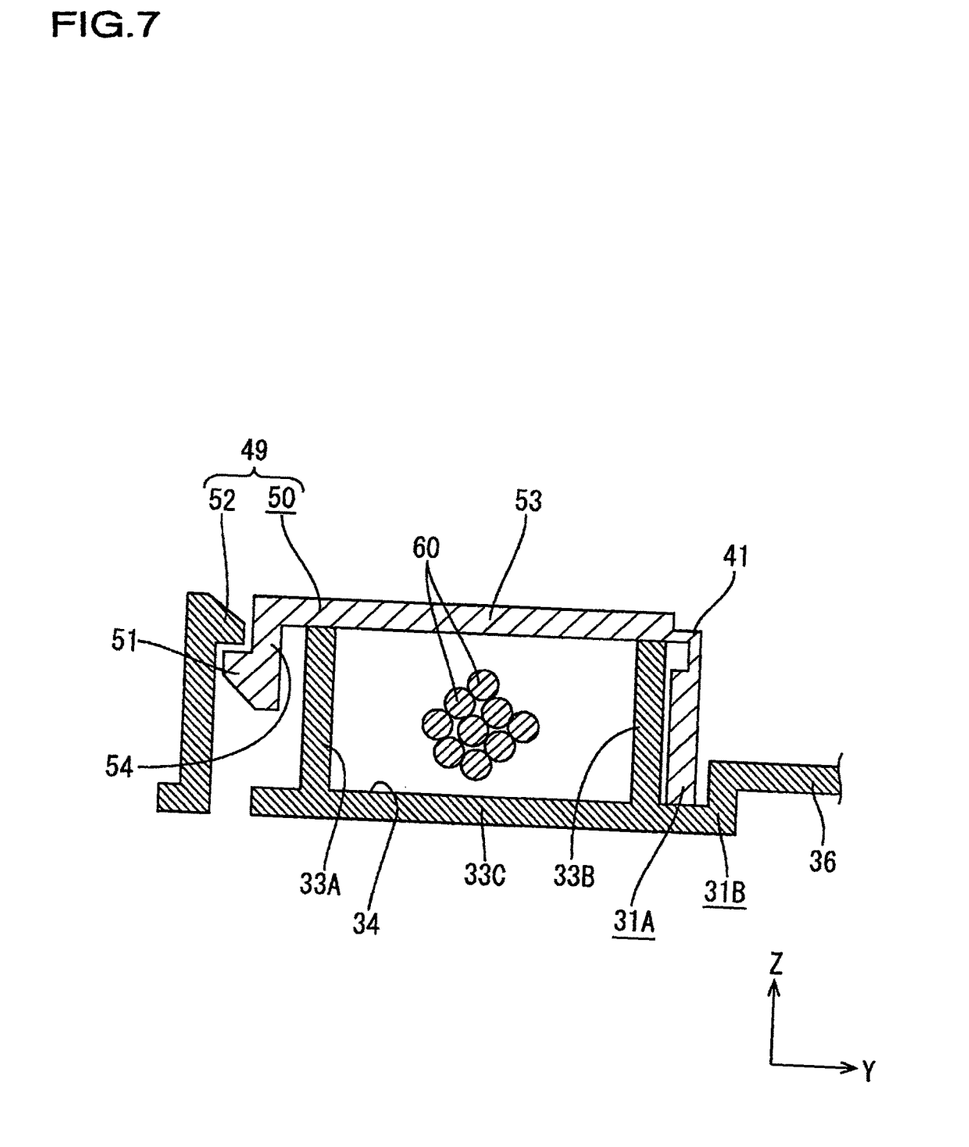
FIG. 7 is a cross-sectional view taken along line D-D in FIG. 5.
Figure 8:
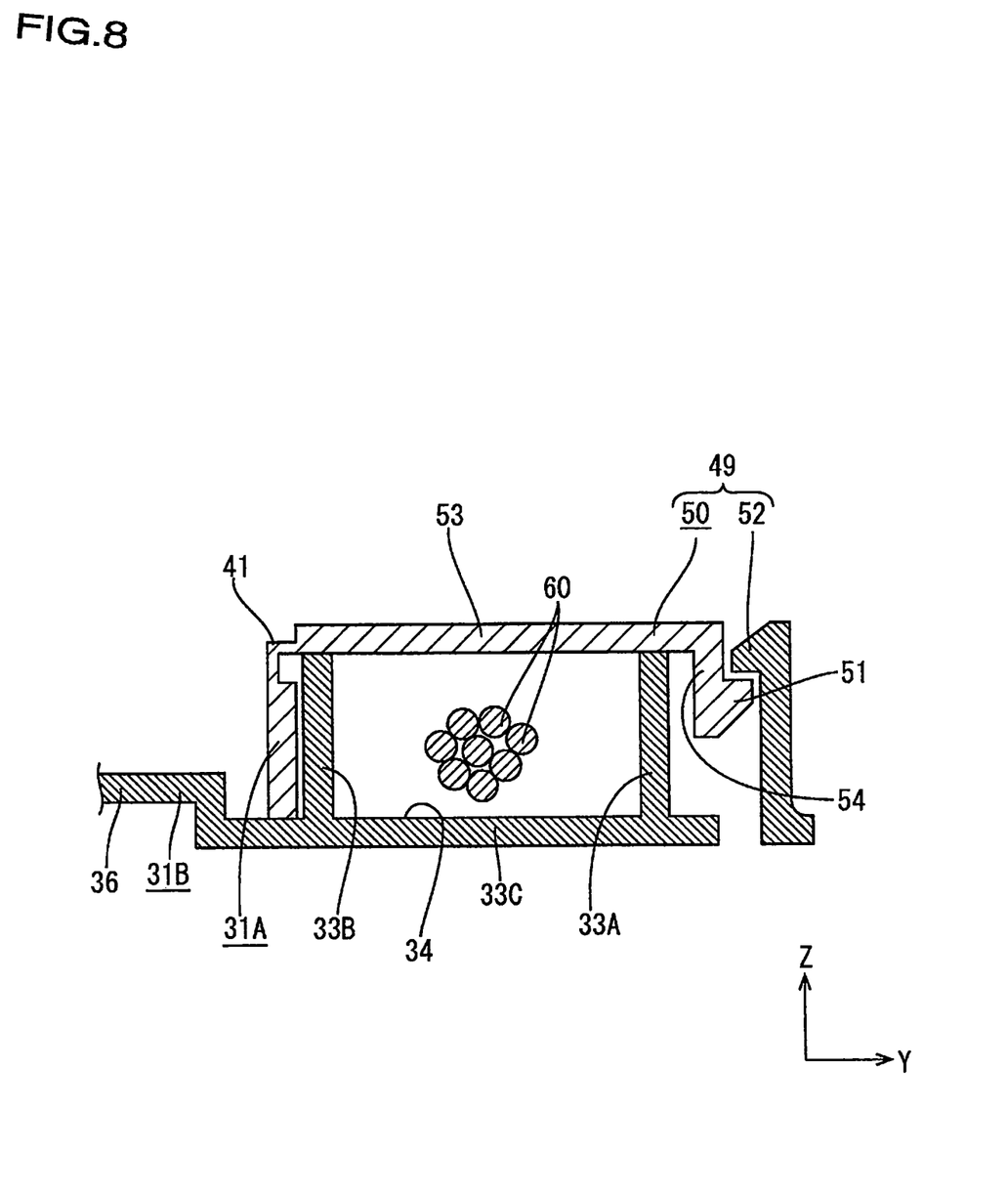
FIG. 8 is a cross-sectional view taken along line E-E in FIG. 5.
Figure 9:
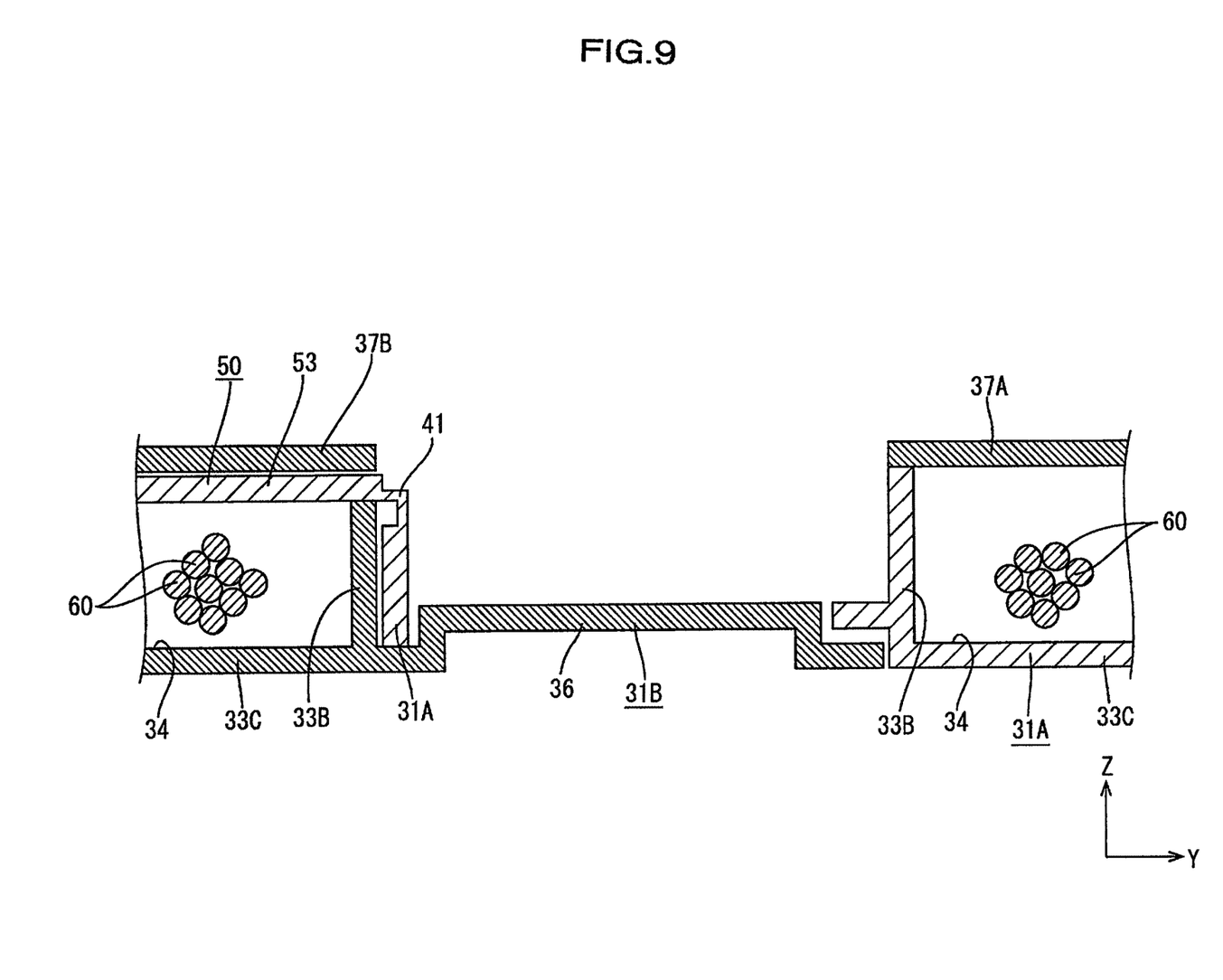
FIG. 9 is a cross-sectional view taken along line A-A in FIG. 1.
Figure 10:
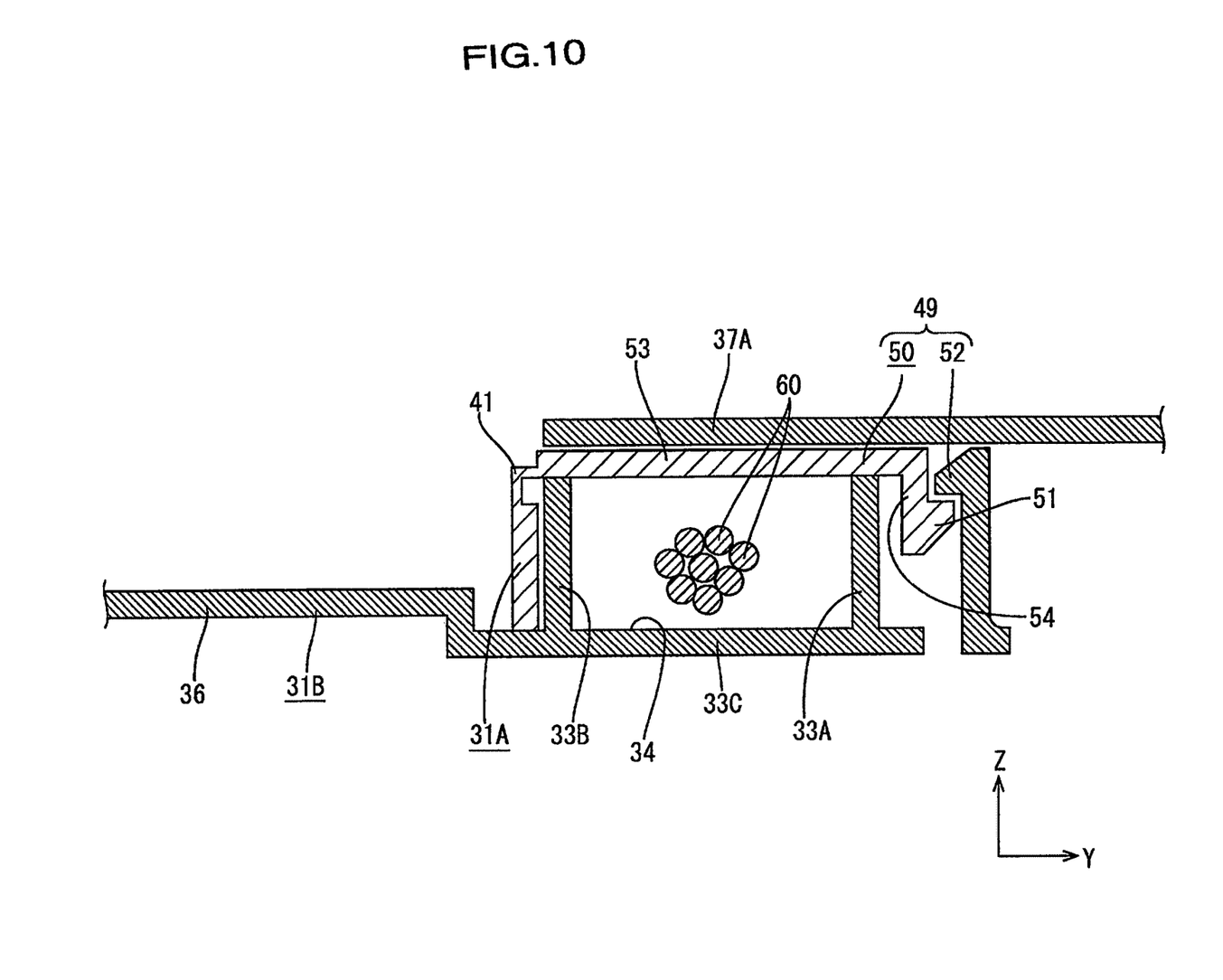
FIG. 10 is a cross-sectional view taken along line B-B in FIG. 1.

The coupling units 31 are arranged side by side in the left-right direction and the locking hooks 51 of the locking portions 50 are locked onto the locked portions 52 (see FIGS. 7 and 8) by rotating the locking portions 50 using the hinges 41 as the axes (see FIG. 4). Upon doing so, the locking portions 50 (main body portion) are arranged so as to span over the routing grooves 34 (see FIG. 6). Accordingly, the multiple wires arranged inside of the routing grooves 34 are suppressed from popping out from above the routing grooves 34.

Furthermore, when the lock portions 39 of the front-side cover 37A are engaged with the lock receiving portions 40 by rotating the front-side covers 37A using the hinges 38 as axes, the front-side holding portion 32A and the front-side routing groove 34A are covered by the front-side covers 37A.

On the other hand, when the lock portions 39 of the rear-side covers 37B are engaged with the lock receiving portions 40 by rotating the rear-side covers 37B using the hinges 38 as axes, the rear-side holding portion 32B and the rear-side routing groove 34B are covered by the rear-side covers 37B.

Furthermore, the front-side covers 37A and the rear-side covers 37B overlap above the locking portions 50. Accordingly, the locking structure of the locking portions 50 and the locked portions 52 is prevented from coming unlocked (see FIGS. 9 and 10).

Actions and Effects of the Embodiment

Next, actions and effects of the present embodiment will be described. The wire module 20 according to the present embodiment is the wire module 20 to be attached to the power storage element group 13 including the multiple power storage elements 12. The wire module 20 includes: the bus bars 21; the multiple coupling units 31 holding the bus bars 21; and the coupling portion 49 coupling the multiple coupling units 31. The coupling portion 49 includes the locking portion 50 arranged on the end portion of the one coupling unit 31 of the multiple coupling units 31 and the locked portion 52 that is arranged on the other coupling unit 31 adjacent to the one coupling unit 31 and with which the locking portion 50 of the one coupling unit 31 is to be engaged. The locking portion 50 extends in a direction intersecting the coupling direction in which the multiple coupling units 31 are coupled.

According to the present embodiment, the multiple coupling units 31 are coupled due to the locking portion 50 and the locked portion 52, which extend in the direction intersecting the coupling direction, engaging. As a result, a fitting portion that extends in the coupling direction is not needed, and therefore space for forming the fitting portion and the fitting recess is not needed. Accordingly, each coupling unit 31 can be made smaller, and as a result, the wiring module 20 can be made smaller.

Also, according to the present embodiment, the locking portions 50 extend in a direction intersecting the coupling direction. Accordingly, if the multiple coupling units 31 are coupled, the strength of the locking portion 50 can be improved in comparison with the case of providing a fitting portion that extends in the coupling direction as in the conventional technique. As a result, if the wiring module 20 is to be attached to the power storage element group 13, the wiring module 20 is prevented from warping excessively, and therefore the efficiency of the task of attaching the wiring module 20 to the power storage element group 13 can be improved.

Also, according to the present embodiment, due to the locking portion 50 being formed extending in the direction intersecting the coupling direction, the locking portion 50 is less likely to warp and deform when a force in the direction along the coupling direction is applied to the wiring module 20. Accordingly, if the multiple power storage elements 12 are arranged side by side, the locking portion 50 can be formed efficiently when a tolerance in the pitch between adjacent electrode terminals is absorbed.

Also, according to the present embodiment, each of the multiple coupling units 31 has a unit groove 35 in which the wires 60 are to be arranged, the routing groove 34 in which the wires 60 are to be arranged is formed by coupling the unit grooves 35 in a state in which the multiple coupling units 31 are coupled, and the locking portion 50 locks onto the locked portion 52 in a state of spanning over the routing groove 34.

According to the above-described configuration, the wires 60 arranged in the routing groove 34 are prevented from protruding from the routing groove 34 by the locking portion 50 that locks onto the locked portion 52 in a state of spanning over the routing groove 34.

Also, the wiring module 20 according to the present embodiment includes the cover 37 covering the wiring groove 34, and the cover 37 overlaps the locking portion 50 from the side opposite to the wiring groove 34 in a state of covering the routing groove 34.

According to the above-described configuration, the locking portion 50 can be prevented from coming off of the locked portion 52 due to the routing groove 34 being covered with the cover 37. Accordingly, it is possible to suppress the coupling of the coupling unit 31 from coming undone.

Other Embodiments

The technique disclosed in the present specification is not limited to the embodiments disclosed through the description above and the drawings, and for example, the following embodiments are also encompassed in the technical scope of the technique disclosed in the present specification.

(1) In the present embodiment, the locking portion 50 is configured to lock onto the locked portion 52 in a state of spanning over the routing groove 34, but there is no limitation to this, and the locking portion 50 may also be configured to lock onto the locked portion 52 at a position different from that of the routing groove 34.

(2) In the present embodiment, a configuration was used in which the routing groove 34 is covered by the cover 37, but the cover 37 may also be omitted.

(3) In the present embodiment, the locking between the locking portion 50 and the locked portion 52 is prevented from coming undone by the cover 37, but there is no limitation to this, and in the state of covering the routing groove 34, the cover 37 may also be separated from the locking portion 50 in the state of being locked onto the locked portion 52.

(4) In the present embodiment, a configuration was used in which three coupling units 31, namely the left coupling unit 31A, the center coupling unit 31B, and the right coupling unit 31C are coupled, but there is no limitation to this, and it is also possible to use a configuration in which two coupling units 31 are coupled, and a configuration in which four or more coupling units 31 are coupled.

(5) In the present embodiment, a configuration was used in which the multiple power storage elements 12 are connected in series, but there is no limitation to this, and it is also possible to use a configuration in which the multiple power storage elements 12 are connected in parallel.

(6) In the present embodiment, a secondary battery was used as the power storage element 12, but there is no limitation to this, and a capacitor may also be used.

(7) In the present embodiment, a configuration was used in which the locking portion 50 is formed integrally with the coupling unit 31 via the hinge 41, but there is no limitation to this, and the locking portion 50 may also be constituted as a separate part from the coupling unit 31.

LIST OF REFERENCE NUMERALS

12 Power storage element
13 Power storage element group
20 Wiring module
21 Bus bar (conductive member)
31A Left coupling unit
31B Center coupling unit
31C Right coupling unit
35 Unit groove
34 Routing groove
37A Front-side cover
37B Rear-side cover
49 Coupling portion
50 Locking portion
52 Locked portion
60 Wire

The invention claimed is:

1. A wiring module to be attached to a battery group having a plurality of batteries, the wiring module comprising:
conductive members;
a plurality of coupling units for holding the conductive members; and
a coupling portion for coupling the plurality of coupling units,
wherein each of the plurality of coupling units includes a unit groove in which a wire is to be arranged, such that when the plurality of coupling units are coupled, the unit grooves are coupled to form a routing groove in which the wire is to be routed,
the coupling portion includes: a locking portion formed integrally via a hinge on an end portion of one coupling unit of the plurality of coupling units; and a locked portion that is arranged on another coupling unit adjacent to the one coupling unit and onto which the locking portion of the one coupling unit is to be locked in a condition rotated about the hinge, the locking portion extends in a direction intersecting a coupling direction in which the plurality of coupling units are coupled, wherein, when the hinge is in an opened state, the locking portion and locked portion are detached from each other, and wherein, when the hinge is in a closed state, the locking portion locks onto the locked portion in a condition spanning over the routing groove of the other coupling unit adjacent to the one coupling unit on which the locking portion is formed such that the locking portion and locked portion are positioned on a same side of the hinge.

2. The wiring module according to claim 1, comprising a cover for covering the routing groove, wherein in a condition covering the routing groove, the cover overlaps with the locking portion from a side opposite to the routing groove.

\* \* \* \* \*